(12) United States Patent
Toda et al.

(10) Patent No.: US 10,907,235 B2
(45) Date of Patent: Feb. 2, 2021

(54) STEEL SHEET

(71) Applicant: NIPPON STEEL & SUMITOMO METAL CORPORATION, Tokyo (JP)

(72) Inventors: Yuri Toda, Tokyo (JP); Kunio Hayashi, Tokyo (JP); Katsuya Nakano, Tokyo (JP); Hiroyuki Kawata, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/330,336

(22) PCT Filed: Sep. 13, 2016

(86) PCT No.: PCT/JP2016/076941
§ 371 (c)(1),
(2) Date: Mar. 4, 2019

(87) PCT Pub. No.: WO2018/051402
PCT Pub. Date: Mar. 22, 2018

(65) Prior Publication Data
US 2019/0226046 A1   Jul. 25, 2019

(51) Int. Cl.
| | |
|---|---|
| *C22C 38/00* | (2006.01) |
| *C22C 38/16* | (2006.01) |
| *B32B 15/01* | (2006.01) |
| *C22C 38/02* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/38* | (2006.01) |
| *C23C 2/40* | (2006.01) |
| *C23F 17/00* | (2006.01) |

(Continued)

(52) U.S. Cl.
CPC .............. *C21D 9/46* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/00* (2013.01); *C22C 38/001* (2013.01); *C22C 38/002* (2013.01); *C22C 38/005* (2013.01); *C22C 38/02* (2013.01); *C22C 38/06* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/06* (2013.01); *C23C 2/28* (2013.01); *C23C 2/40* (2013.01); *C23F 17/00* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC .......... C21D 9/46; C21D 6/002; C21D 6/005; C21D 6/008; C21D 8/0205; C21D 8/0226; C21D 8/0263; C21D 8/0278; B32B 15/013; C22C 38/00; C22C 38/001; C22C 38/002; C22C 38/005; C22C 38/02; C22C 38/06; C22C 38/16; C22C 38/20; C22C 38/22; C22C 38/24; C22C 38/26; C22C 38/28; C22C 38/32; C22C 38/38; C23C 2/06; C23C 2/28; C23C 2/40
USPC ........................................................ 428/659
See application file for complete search history.

(56) References Cited

U.S. PATENT DOCUMENTS

2009/0136378 A1   5/2009  Satou et al.
2013/0273392 A1   10/2013 Nonaka et al.
(Continued)

FOREIGN PATENT DOCUMENTS

| CN | 105734410 A | 7/2016 |
|---|---|---|
| EP | 2 295 615 A1 | 3/2011 |

(Continued)

OTHER PUBLICATIONS

Bhadeshia, "Bainite in Steels: Theory and Practice," 2015, URL: <https://www.academia.edu/40170232/BAINITE_IN_STEELS_THEORY_AND_PRACTICE_THIRD_EDITION>, Pgs. Title p. i-x, 287-302 (Year: 2015).*

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A steel sheet according to an aspect of the present invention has a chemical composition within a predetermined range; in which a metallographic structure at a thickness ¼ portion includes, by unit area %, ferrite: 10% or more and less than 50%, granular bainite: 5% or more and less than 50%, and martensite: 20% or more and less than 60%; in the metallographic structure at the thickness ¼ portion, a total of upper bainite, lower bainite, residual austenite, and pearlite is 0% or more and less than 15% by unit area %; at the thickness ¼ portion, a product of an area ratio Vm of the martensite and an average hardness Hv of the martensite is 12,000 to 34,000; and a tensile strength is 980 MPa or higher.

7 Claims, No Drawings

(51) Int. Cl.
*C21D 9/46* (2006.01)
*C23C 2/06* (2006.01)
*C23C 2/28* (2006.01)
*C21D 6/00* (2006.01)
*C21D 8/02* (2006.01)

(56) References Cited

U.S. PATENT DOCUMENTS

| 2014/0044989 A1 | 2/2014 | Toda et al. |
| 2014/0166163 A1 | 6/2014 | Jamwal et al. |
| 2014/0230970 A1 | 8/2014 | Perlade et al. |

FOREIGN PATENT DOCUMENTS

| EP | 2 365 103 A1 | 9/2011 | |
| EP | 2653582 A1 * | 10/2013 | ............... C23C 2/06 |
| EP | 2 803 748 A1 | 11/2014 | |
| JP | 7-11383 A | 1/1995 | |
| JP | 7-207413 A | 8/1995 | |
| JP | 2616350 B2 | 6/1997 | |
| JP | 2007-9317 A | 1/2007 | |
| JP | 2007-70659 A | 3/2007 | |
| JP | 2007-254857 A | 10/2007 | |
| JP | 2009-1909 A | 1/2009 | |
| JP | 2011-52271 A | 3/2011 | |
| TW | 201217547 A1 | 5/2012 | |
| WO | WO 2012/081666 A1 | 6/2012 | |
| WO | WO 2012/144567 A1 | 10/2012 | |

OTHER PUBLICATIONS

"Metallic materials-Hole expanding test", JIS Z 2256, 2010, total 17 pages.
"Method for Charpy pendulum impact test of metallic materials", JIS Z 2242, 2005, total 26 pages.
"Test pieces for tensile test for metallic materials", JIS Z 2201, 1998, total 6 pages.
International Search Report for PCT/JP2016/076941 dated Nov. 15, 2016.
Office Action for TW 105129718 dated Jun. 26, 2017.
Written Opinion of the International Searching Authority for PCT/JP2016/076941 (PCT/ISA/237) dated Nov. 15, 2016.
European Search Report for Application No. 16916187.4, dated Feb. 28, 2020.

* cited by examiner

STEEL SHEET

TECHNICAL FIELD OF THE INVENTION

The present invention relates to a steel sheet. Particularly, the present invention relates to a cold rolled high strength steel sheet which is suitable for a material of a vehicle component and the like, has tensile strength of 980 MPa or higher, and has excellent total elongation and hole expansibility.

RELATED ART

In order to suppress the amount of carbonic acid gas discharged from vehicles, weight reduction of a vehicle body of a vehicle using a high strength steel sheet is being in progress. In addition, in order to ensure the safety of an occupant as well, high strength steel sheets have been often used for a vehicle body of a vehicle, in addition to soft steel sheets. In the future, in order to further proceed in weight reduction of a vehicle body of a vehicle, strength of high strength steel sheets has to be further increased than that in the related art.

In order to obtain a member for a vehicle by forming a high strength steel sheet, favorable formability is also required for the high strength steel sheet. For example, in a case of using a high strength steel sheet for manufacturing a skeletal component, elongation and hole expansibility of the high strength steel sheet are required to be ameliorated. However, generally, if a steel sheet is subjected to high-strengthening, formability such as elongation and hole expansibility is degraded.

Regarding thin high strength steel sheets, several ways for solving these problems have been proposed. For example, in Patent Document 1, a metallographic structure of a steel sheet is caused to be a composite structure including ferrite which is a soft structure and martensite which is a hard structure, so that both strength and elongation are enhanced. However, the composite structure disclosed in Patent Document 1 is a combination of a soft structure and a hard structure. A composite structure constituted of structures which significantly differ from each other in hardness has poor hole expansibility.

In Patent Document 2, a metallographic structure of a steel sheet is caused to be a single structure of upper bainite or lower bainite having intermediate hardness between ferrite and martensite, so that the hardness difference between structures is reduced and strength and hole expansibility are improved. However, since upper bainite and lower bainite are constituted of bainitic ferrite including many dislocations, and hard cementite, the structure has poor elongation.

In addition, in Patent Document 3, formability is ameliorated by utilizing residual austenite. However, it is targeted at a range of 45 kgf/mm$^2$ to 65 kgf/mm$^2$. Therefore, it is difficult to achieve both high strength, that is, 980 MPa or higher, and sufficient formability.

PRIOR ART DOCUMENT

Patent Document

[Patent Document 1] Japanese Unexamined Patent Application, First Publication No. H7-11383
[Patent Document 2] Japanese Patent No. 2616350
[Patent Document 3] Japanese Unexamined Patent Application, First Publication No. H7-207413

DISCLOSURE OF THE INVENTION

Problems to be Solved by the Invention

As described above, for the sake of weight reduction of a vehicle body of a vehicle, strength of a high strength steel sheet has to be increased. In addition, in order to use a high strength steel sheet as a material of a vehicle body of a vehicle, for example, as a material of a skeletal component, total elongation has to be improved without deteriorating hole expansibility of the high strength steel sheet. In a case where a high strength steel sheet having tensile strength of 980 MPa or higher is used as a skeletal member of a vehicle, it is possible to apply excellent impact safety to a vehicle body. Forming for obtaining a skeletal member can be applied to a high strength steel sheet in which the product of tensile strength and total elongation (TS×E1) is 10,000 MPa·% or higher and the product of tensile strength and hole expansibility (TS×λ) is 20,000 MPa·% or higher. However, according to the technologies in the related art, it is extremely difficult to manufacture a high strength steel sheet having all of excellent strength, excellent elongation, and excellent hole expansibility.

In consideration of the current circumstances of the technologies in the related art, an object of the present invention is to provide a high strength steel sheet which has tensile strength of 980 MPa or higher and has excellent elongation (particularly, total elongation) and hole expansibility.

Means for Solving the Problem

The gist of the present invention is as follows.

(1) According to an aspect of the present invention, there is provided a steel sheet including, as a chemical composition, by unit mass %, C: 0.06% to 0.15%, P: 0.040% or less, S: 0.0100% or less, N: 0.0100% or less, O: 0.0060% or less, Si and Al in total: 0.20% to 2.50%, Mn and Cr in total: 1.50% to 3.00%, Mo: 0% to 1.00%, Ni: 0% to 1.00%, Cu: 0% to 1.00%, Nb: 0% to 0.30%, Ti: 0% to 0.30%, V: 0% to 0.50%, B: 0% to 0.0100%, Ca: 0% to 0.0400%, Mg: 0% to 0.0400%, REM: 0% to 0.0400%, and a remainder including Fe and impurities; in which a metallographic structure at a thickness ¼ portion includes, by unit area %, ferrite: 10% or more and less than 50%, granular bainite: 5% or more and less than 50%, and martensite: 20% or more and less than 60%; in the metallographic structure at the thickness ¼ portion, a total of upper bainite, lower bainite, residual austenite, and pearlite is 0% or more and less than 15% by unit area %; at the thickness ¼ portion, a product of an area ratio Vm of the martensite and an average hardness Hv of the martensite is 12,000 to 34,000; and a tensile strength is 980 MPa or higher.

(2) The steel sheet according to (1) may include, as the chemical composition of the steel sheet, by unit mass %, one or more of Mo: 0.01% to 1.00%, Ni: 0.05% to 1.00%, and Cu: 0.05% to 1.00%.

(3) The steel sheet according to (1) or (2) may include, as the chemical composition of the steel sheet, by unit mass %, one or more of Nb: 0.005% to 0.30%, Ti: 0.005% to 0.30%, and V: 0.005% to 0.50%.

(4) The steel sheet according to any one of (1) to (3) may include, as the chemical composition of the steel sheet, by unit mass %, B: 0.0001% to 0.01%.

(5) The steel sheet according to any one of (1) to (4) may include, as the chemical composition of the steel sheet, by unit mass %, one or more of Ca: 0.0005% to 0.04%, Mg: 0.0005% to 0.04%, and REM: 0.0005% to 0.04%.

(6) In the steel sheet according to any one of (1) to (5), a hot-dip galvanized layer may be provided on a surface of the steel sheet.

(7) In the steel sheet according to any one of (1) to (5), a galvannealed layer may be provided on a surface of the steel sheet.

Effects of the Invention

According to the present invention, it is possible to provide a cold rolled high strength steel sheet which is suitable for a structural member of a vehicle and the like, has tensile strength of 980 MPa or higher, and has excellent elongation (particularly, total elongation) and hole expansibility.

EMBODIMENT OF THE INVENTION

In order to use a high strength steel sheet as a material of a skeletal component of a vehicle body of a vehicle, elongation of the high strength steel sheet has to be improved without deteriorating hole expansibility, such that formability of the high strength steel sheet is thereby ensured. In order to sufficiently ensure the collision safety of a vehicle when a high strength steel sheet is used as a skeletal component of a vehicle body of a vehicle, the high strength steel sheet is required to have tensile strength of 980 MPa or higher. In addition, in order to cause a high strength steel sheet to be formable as a skeletal component while this condition is satisfied, the high strength steel sheet is required to have the product of tensile strength and elongation (TS×E1) of 10,000 MPa·% or higher, and the product of tensile strength and hole expansibility (TSλ) of 20,000 MPa·% or higher. Although the strength (TS) and the elongation (E1) tend to be in inverse proportion to each other, in a case where TS×E1 is significant, both strength and elongation are high. Similarly, although the strength (TS) and the hole expansibility ($\lambda$) tend to be in inverse proportion to each other, in a case where TS×$\lambda$ is significant, both strength and hole expansibility are high.

However, in a high strength steel sheet for a vehicle, it is extremely difficult to increase TS×E1 and TS×$\lambda$ (that is, it is extremely difficult to improve all of strength, elongation, and hole expansibility). In the technologies in the related art described above, regarding steel sheets, in order to ameliorate elongation without deteriorating strength and hole expansibility, upper bainite or lower bainite constituted of bainitic ferrite including many dislocations and hard cementite has been used. However, the inventors have ascertained that it is difficult to improve elongation while ensuring strength and hole expansibility, by using upper bainite or lower bainite.

The inventors have ascertained that in a case where the area ratio of granular bainite included in a metallographic structure of a high strength steel sheet having tensile strength of 980 MPa or higher is stably controlled, elongation can be improved while strength and hole expansibility of this high strength steel sheet are ensured. That is, the inventors have found that elongation can be improved while strength and hole expansibility of a high strength steel sheet are ensured in a case where the metallographic structure at a thickness ¼ portion of the steel sheet includes, by unit area %, ferrite of 10% or more and less than 50%, granular bainite of 5% or more and less than 50%, and martensite of 20% or more and less than 60%; upper bainite, lower bainite, residual austenite, and pearlite in the metallographic structure at the thickness ¼ portion are limited to an amount less than 15% in total, and the product of an area ratio Vm of martensite at the thickness ¼ portion and an average hardness Hv of martensite at the thickness ¼ portion satisfies (Expression 1).

$$12{,}000 < Vm \times Hv < 34{,}000 \quad \text{(Expression 1)}$$

Hereinafter, the metallographic structure of a steel sheet according to the present embodiment will be described. In the steel sheet according to the present embodiment, the metallographic structure at the thickness ¼ portion of the steel sheet is controlled. In a case where a sheet thickness t of a steel sheet is defined as a distance between rolled surfaces of the steel sheet, the thickness ¼ portion of the steel sheet indicates a portion of the steel sheet in the vicinity of a plane at the depth of ⅛ in the sheet thickness t from the rolled surface, and a portion in the vicinity of a plane at the depth of ⅜ in the sheet thickness t from the rolled surface. The thickness ¼ portion of the steel sheet is a place positioned between the rolled surface of the steel sheet and a central plane of the steel sheet, so that the thickness ¼ portion has a typical structure of a steel sheet. If the metallographic structure at the thickness ¼ portion of a steel sheet is preferably controlled, it is determined that the metallographic structure of the entire steel sheet is preferably controlled. Hereinafter, unless otherwise specified, "an area ratio" means "an area ratio in the metallographic structure at the thickness ¼ portion of a steel sheet".

(Area Ratio of Ferrite in Metallographic Structure at Thickness ¼ Portion of Steel Sheet: 10% or More and Less than 50%)

Ferrite included in the metallographic structure of a steel sheet is likely to be deformed due to its soft structure. Therefore, elongation of a steel sheet is improved, and generation of granular bainite is promoted. This is due to the fact that nucleation of granular bainite is more likely to be formed in a grain boundary between austenite and ferrite than in a grain boundary between austenite and austenite. The inventors have found that 10% or more of ferrite is included in a finally obtained steel sheet in a case where ferrite is generated such that transformation from austenite to granular bainite is promoted in the steel sheet which is being manufactured. Therefore, the lower limit value for the area ratio of ferrite is set to 10%. On the other hand, in a case where the area ratio of ferrite is 50% or higher, tensile strength of a steel sheet is significantly deteriorated, so that the area ratio of ferrite is required to be less than 50%. The upper limit value for the area ratio of ferrite is preferably 40% and is more preferably 35%. The lower limit value for the area ratio of ferrite is preferably 15% and is more preferably 20%.

(Area Ratio of Granular Bainite in Metallographic Structure at Thickness ¼ Portion of Steel Sheet: 5% or More and Less than 50%)

Granular bainite is bainite having a grain shape and is distinguished from ordinary bainite having an acicular shape. Ordinary bainite has a structure mainly constituted of hard cementite and acicular bainitic ferrite. However, granular bainite seldom includes hard cementite and is constituted of bainitic ferrite having a low dislocation density. Due to this constitution, hardness of granular bainite is higher than hardness of ferrite and is lower than hardness of ordinary bainite, so that the hardness difference between ferrite and martensite is reduced. Therefore, a steel sheet including granular bainite becomes a steel sheet having excellent balance between elongation and hole expansibility. As described above, in order to promote generation of granular bainite, the steel sheet according to the present embodiment is required to contain ferrite. In addition, as described below, in order to improve strength, the steel sheet according to the present embodiment is required to contain martensite. However, since the hardness difference between ferrite and martensite is significant, in a case where a steel sheet is subjected to hole widening, there are cases where voids are generated in an interface between ferrite and martensite and these voids cause poor working. Moreover, granular bainite included in the steel sheet according to the present embodiment is harder than ferrite and is softer than martensite, so that it is possible to suppress voids generated in an interface between ferrite and martensite during hole widening. Due to these reasons, the lower limit value for the area ratio of granular bainite is set to 5%. On the other hand, if granular bainite is excessively generated, martensite becomes insufficient and strength of a steel sheet is impaired, so that the upper limit value for the area ratio of granular bainite is required to be set to 50%. The upper limit value for the area ratio of granular bainite is preferably 45% and is more preferably 35%. The lower limit value for the area ratio of granular bainite is preferably 10% and is more preferably 20%.

(Area Ratio of Martensite in Metallographic Structure at Thickness ¼ Portion of Steel Sheet: 20% or More and Less than 60%)

The steel sheet according to the present embodiment includes martensite of 20% or more and less than 60%. In this specification, the term "martensite" includes both fresh martensite (untempered martensite) and tempered martensite. In order to ameliorate hole expansibility, it is important to reduce the hardness difference between martensite, and ferrite and granular bainite. Therefore, fresh martensite may be transformed into tempered martensite by performing tempering to a steel sheet to the extent that strength is not drastically reduced. Tempering may be performed in a continuous annealing line or a continuous zinc coating line while a steel sheet is being cooled to room temperature or may be performed after a steel sheet is cooled to room temperature. In addition, the same effect can be achieved even if tempering is separately performed through box annealing or the like.

Martensite included in the metallographic structure of a steel sheet has a high dislocation density and a hard structure, so that tensile strength of the steel sheet is improved. In order to ensure tensile strength of 980 MPa or higher, the lower limit value for the area ratio of marten site is set to 20%. On the other hand, in a case where the area ratio of martensite is 60% or more, elongation and hole expansibility are significantly deteriorated, so that the area ratio of martensite is required to be controlled to be less than 60%. The upper limit value for the area ratio of martensite is preferably 45% and is more preferably 40%.

(Vm×Hv: 12,000 to 34,000)

Martensite included in the metallographic structure of a steel sheet has a high dislocation density and a hard structure, so that tensile strength is improved. In order to ensure tensile strength of 980 MPa or higher, the product of the area ratio Vm of martensite at the thickness ¼ portion and the average hardness Hv of martensite at the thickness ¼ portion (Vm×Hv) is required to satisfy (Expression 1). In a case where Vm×Hv is smaller than 12,000, tensile strength of 980 MPa or higher cannot be ensured, so that the lower limit value for Vm×Hv is set to 12,000. On the other hand, in a case where Vm×Hv exceeds 34,000, the area ratio of martensite in a microstructure is in a high state, and/or the average hardness of martensite is in an increased state. In this case, the product of tensile strength and elongation (TS×E1) of a steel sheet falls below 10,000 MPa·%, and/or the product of tensile strength and hole expansibility (TS×λ) of the steel sheet falls below 20,000 MPa·%. A steel sheet which does not satisfy these conditions does not sufficiently have hole expansibility for being capable of manufacturing a skeletal member of a vehicle body of a vehicle, or strength for ensuring the safety at the time of collision. Therefore, the upper limit for Vm×Hv is set to 34,000. Here, the unit of Vm is area %, and the unit of the average hardness Hv is Vickers hardness.

$$12{,}000 < Vm \times Hv < 34{,}000 \qquad \text{(Expression 1)}$$

(Total Area Ratio of Upper Bainite, Lower Bainite, Residual Austenite, and Pearlite in Metallographic Structure at Thickness ¼ Portion of Steel Sheet: Less than 15%)

Upper bainite and lower bainite have a high dislocation density in a microstructure and reduce the martensite fraction in a microstructure, so that strength of a steel sheet is deteriorated. In addition, if cementite (included in bainite, tempered martensite, and the like) is excessively precipitated, elongation of a steel sheet is significantly degraded. In addition, residual austenite and pearlite significantly deteriorate hole expansibility of a steel sheet. Residual austenite is transformed into hard martensite due to working induced transformation during deformation of a steel sheet, so that hole expansibility of a steel sheet is significantly deteriorated. Pearlite is a metallographic structure including hard cementite, so that it becomes the origin a void generated during hole widening.

It is favorable that upper bainite, lower bainite, residual austenite, and pearlite are not included in the steel sheet according to the present embodiment. Therefore, the lower limit value for the total area ratio of upper bainite, lower bainite, residual austenite, and pearlite is 0%. On the other hand, if the total of upper bainite, lower bainite, residual austenite, and pearlite becomes 15% or more, elongation and hole expansibility are significantly deteriorated. However, in the steel sheet according to the present embodiment, the total area ratio of upper bainite, lower bainite, residual austenite, and pearlite being less than 15% is allowed. The upper limit value for the total area ratio of upper bainite, lower bainite, residual austenite, and pearlite is preferably 10%.

An example of a method for calculating the area ratio of ferrite, granular bainite, martensite, upper bainite, lower bainite, residual austenite, and pearlite is as follows.

The area ratio of ferrite can be calculated by observing an electron channeling contrast image of a cross section at the thickness ¼ portion which can be obtained by using a scanning electron microscope. An electron channeling contrast image is an image displaying the crystal orientation difference inside a grain as the difference in the contrast of the image, and a part having a uniform contrast in the image is ferrite.

The area ratio of residual austenite can be calculated by observing a cross section at the thickness ¼ portion etched with a Le Pera solution, using a field-emission scanning electron microscopy. In addition, the area ratio of residual austenite can also be calculated through measurement using an X-ray diffraction device. In measurement using an X-ray diffraction device, first, a region from a sheet surface (rolled surface) of a sample to a plane at the depth of ¼ in the sheet thickness t is eliminated through mechanical polishing and chemical polishing. Next, on the plane at the depth of ¼ in the sheet thickness t, the integrated intensity ratio of diffraction peaks of (200) and (211) in a bcc phase, and (200), (220), and (311) in an fcc phase is obtained by using a MoKα-ray as a characteristic X-ray. The volume percentage of residual austenite can be calculated based on the integrated intensity ratio thereof. This volume percentage of residual austenite can be regarded as the area ratio of residual austenite.

The area ratio of martensite can be calculated by observing an image of a cross section at the thickness ¼ portion etched with a Le Pera solution, which is obtained by using a field-emission scanning electron microscopy. A region in a field-emission scanning electron microscopy image which has not corroded includes martensite and residual austenite, so that the area ratio of martensite can be calculated by subtracting the area ratio of residual austenite measured by using an X-ray diffraction device from the area ratio of the region which has not corroded. Alternatively, in an electron channeling contrast image which is obtained by using a scanning electron microscope, martensite can be distinguished from other metallographic structures. In an electron channeling contrast image, a region having a high dislocation density and having a lower structure such as a block and a packet in the grain is martensite.

Upper bainite, lower bainite, and tempered martensite can be identified by observing the position of cementite and variants included inside the structure in a cross section at the thickness ¼ portion which has corroded due to a nital reagent, using a field-emission scanning electron microscopy. Upper bainite is constituted of lath-shaped bainitic ferrite, and cementite or residual austenite generated in an interface therebetween. On the other hand, lower bainite is constituted of lath-shaped bainitic ferrite, and cementite generated therein. Therefore, upper bainite and lower bainite can be distinguished from each other based on the position of cementite. Since there is one kind of the relationship between the crystal orientations of bainitic ferrite and cementite, cementite constituting upper bainite and lower bainite has the same variant. On the other hand, tempered martensite is constituted of martensite lath, and cementite generated therein. Since there are two or more kinds of the crystal orientations of martensite lath and cementite, cementite constituting tempered martensite has a plurality of variants. Therefore, upper bainite, lower bainite, tempered martensite can be distinguished from one another based on the variants of cementite. In this manner, each of the structures can be identified and the area ratio of the structure can be calculated by detecting the features of cementite.

Pearlite can be identified by observing a cross section at the thickness ¼ portion which has corroded due to a nital reagent, using an optical microscope. A region having dark contrast in an optical microscope image is pearlite.

Granular bainite is constituted of bainitic ferrite having a low dislocation density and seldom includes hard cementite. Therefore, in corrosion methods in the related art, a secondary electronic image observation using a scanning electron microscope, and the like, granular bainite and ferrite cannot be distinguished from each other. As a result of intensive examination, the inventors have found that granular bainite is constituted of an aggregate of bainitic ferrite, so that it has a grain boundary having a small orientation difference therein. In the steel sheet according to the present embodiment, "a grain boundary having a small orientation difference" indicates an interface of two crystals or sub-crystals having an orientation difference of two degrees or smaller. Ferrite seldom has a grain boundary having a small orientation difference therein. Therefore, based on the presence or absence of a grain boundary having a small orientation difference, granular bainite and ferrite can be discriminated from each other. Based on this knowledge, the inventors have conceived a method for measuring the area ratio of granular bainite, as follows. First, the thickness ¼ portion is analyzed at intervals of 0.2 µm by using an electron back scattering diffraction (EBSD) device, and the value of grain average misorientation is calculated from the measurement data. The grain average misorientation indicates a value obtained by calculating the orientation difference between the measurement points adjacent to each other in a region surrounded by grain boundaries of which the orientation difference is 5° or larger, and averaging the orientation differences in all of the measurement points inside grains. The interval of the measurement points can be set to 0.2 µm, for example. According to this technique, it is possible to detect a grain boundary having a small orientation difference in bainitic ferrite. A region in which the value of grain average misorientation becomes less than 0.5° can be regarded as ferrite. A value obtained by subtracting the area ratios of upper bainite, lower bainite, tempered martensite, pearlite, and martensite from the area ratio of a region in which the value of grain average misorientation becomes 0.5° or larger can be regarded as the area ratio of granular bainite.

The average hardness of martensite at the thickness ¼ portion is obtained by measuring hardness of martensite at the thickness ¼ portion, using a Vickers hardness meter. The hardness is measured such that an indentation made during the measurement of Vickers hardness is included inside one martensite grain. Hardness of 50 martensite grains is measured, and the average value of the hardness of the grains can be regarded as the average hardness Hv of martensite at the thickness ¼ portion.

Next, the chemical composition of the steel sheet according to the present embodiment will be described. Unless otherwise specified, the unit "%" of the amount of each element means "mass %".

(C: 0.06% to 0.15%)

C is an element which ensures martensite of 20 area % or more and improves strength of a steel sheet. In a case where the C content is less than 0.06%, it is difficult to obtain martensite of 20 area % or more, so that a steel sheet having tensile strength of 980 MPa or higher cannot be obtained. On the other hand, in a case where the C content exceeds 0.15%, generation of ferrite is suppressed, so that elongation of a steel sheet is deteriorated. Therefore, the C content is set to 0.06% to 0.15%. The upper limit value for the C content is preferably 0.13% and is more preferably 0.11%. The lower limit value for the C content is preferably 0.07% and is more preferably 0.075%.

(P: 0.040% or Less)

P is an impurity element and is an element which is segregated in a central portion of a steel sheet in the sheet thickness, thereby hindering toughness and embrittling a welded part. In a case where the P content exceeds 0.040%, hole expansibility of a steel sheet is significantly deteriorated due to degradation of toughness. Therefore, the P content is required to be set to 0.040% or less. The P content is preferably 0.010% or less. Since it is more preferable to have less P, the lower limit value for the P content is not particularly limited. However, it is economically disadvantageous to have the P content of less than 0.0001% in a steel sheet. Therefore, 0.0001% may be set as a practically lower limit value for the P content.

(S: 0.0100% or Less)

S is an impurity element and is an element which hinders weldability and hinders manufacturability during casting and hot rolling. In addition, S is an element which forms coarse MnS and hinders hole expansibility of a steel sheet. In a case where the S content exceeds 0.0100%, degradation of weldability, degradation of manufacturability, and significant degradation of hole expansibility occur. Therefore, the S content is required to be set to 0.0100% or less. The S content is preferably 0.0050% or less. Since it is more preferable to have less S, the lower limit value for the S content is not particularly limited. However, it is economically disadvantageous to have the S content of less than 0.0001% in a steel sheet. Therefore, 0.0001% may be set as a practically lower limit value for the S content.

(N: 0.0100% or Less)

N forms coarse nitride and hinders bendability and hole expansibility. In addition, N is an element which causes generation of blowholes during welding. In a case where the N content exceeds 0.0100%, degradation of hole expansibility and generation of blowholes become significant. Therefore, the N content is required to be set to 0.0100% or less. Since it is more preferable to have less N, the lower limit value for the N content is not particularly limited. However, the N content of less than 0.0005% in a steel sheet results in a drastic increase in the manufacturing cost. Therefore, 0.0005% may be set as a practically lower limit value for the N content.

(O: 0.0060% or Less)

O forms coarse oxide and hinders bendability and hole expansibility. In addition, O is an element which causes generation of blowholes during welding. In a case where the O content exceeds 0.0060%, degradation of hole expansibility and generation of blowholes become significant. Therefore, it is preferable that the O content is 0.0060% or less. Since it is more preferable to have less O, the lower limit value for the O content is not particularly limited. However, the O content of less than 0.0005% in a steel sheet results in a drastic increase in the manufacturing cost. Therefore, 0.0005% may be set as a practically lower limit value for the 0 content.

(Si and Al: 0.20% to 2.50% in total)

Si and Al are elements essential for obtaining granular bainite of 5 area % or more. Granular bainite is a metallographic structure which is generated when dislocation present in an interface of bainitic ferrite is recovered due to heat and a plurality of grains of bainitic ferrite become bainitic ferrite in one ingot state. Therefore, if cementite is generated in an interface of bainitic ferrite before granular bainite is generated during a process of manufacturing a steel sheet, this cementite hinders bonding between grains of bainitic ferrite, so that granular bainite cannot be obtained. Si and Al are elements which suppress generation of cementite. As a result of intensive examination, the inventors have found that Si and Al of 0.20% or more in total are required to be contained in order to obtain granular bainite of 5 area % or more. Therefore, the total of the Si content and the Al content is set to 0.20% or more. On the other hand, in a case where the Si content and the Al content which are elements generating ferrite are excessive, not only the area fraction of ferrite exceeds the upper limit, but also toughness of a steel sheet is deteriorated. Therefore, the upper limit value for the total of the Si content and the Al content is 2.50%. The lower limit value for the total of the Si content and the Al content is preferably 0.30% and is more preferably 0.40%. The upper limit value for the total of the Si content and the Al content is preferably 2.00% and is more preferably 1.60%. Since Si and Al have similar operations in the steel sheet according to the present embodiment, even when one of the Si content and the Al content in a steel sheet is 0%, if the other content is 0.20% to 2.50%, the effects described above can be achieved.

(Mn and Cr: 1.50% to 3.00% in total)

Mn and Cr are elements which improve strength of a steel sheet. In addition, Mn and Cr are elements which suppress ferritic transformation occurring in a steel sheet during heat treatment in annealing equipment or hot dip galvanizing equipment. In a case where the total of Mn content and Cr content is less than 1.50%, ferrite of 50 area % or more is generated, so that a steel sheet having tensile strength of 980 MPa or higher cannot be obtained. Therefore, the total of the Mn content and the Cr content is required to be set to 1.50% or more. On the other hand, in a case where the total of the Mn content and the Cr content exceeds 3.00%, ferritic transformation is excessively suppressed and ferrite of 10 area % or more cannot be ensured, so that elongation of a steel sheet is deteriorated. Therefore, the total of the Mn content and the Cr content is required to be set to 3.00% or less. The lower limit value for the total of the Mn content and the Cr content is preferably 1.80% and is more preferably 2.00%. The upper limit value for the total of the Mn content and the Cr content is preferably 2.80% and is more preferably 2.60%. Since Mn and Cr have similar operations in the steel sheet according to the present embodiment, even when one of the Mn content and the Cr content in a steel sheet is 0%, if the other content is 1.50% to 3.00%, the effects described above can be achieved.

(Mo: 0% to 1.00%)

The steel sheet according to the present embodiment is not required to include Mo. Therefore, the lower limit value for the Mo content is 0%. However, Mo is an element which is effective in improving strength of a steel sheet. In addition, Mo is an element which suppresses ferritic transformation occurring in a steel sheet during heat treatment in annealing equipment or hot dip galvanizing equipment, ensures the area ratio of martensite by suppressing excessive ferritic transformation, and enhances strength of a steel sheet. In order to achieve the effect, Mo of 0.01% or more may be contained. On the other hand, in a case where the Mo content exceeds 1.00%, the effect of suppressing ferritic transformation is saturated, so that there is no need to substantially contain Mo exceeding 1.00%. Therefore, the upper limit value for the Mo content is 1.00%.

(Ni: 0% to 1.00%)

The steel sheet according to the present embodiment is not required to include Ni. Therefore, the lower limit value for the Ni content is 0%. However, Ni is an element which is effective in improving strength. Ni is an element which increases the amount of martensite by suppressing ferritic transformation occurring during heat treatment in continuous annealing equipment or continuous hot dip galvanizing equipment and enhances strength of a steel sheet. In order to achieve the effect, Ni of 0.05% or more may be contained. On the other hand, in a case where the Ni content exceeds 1.00%, the effect of suppressing ferritic transformation is saturated, so that there is no need to substantially contain Ni exceeding 1.00%. Therefore, the upper limit value for the Ni content is 1.00%.

(Cu: 0% to 1.00%)

The steel sheet according to the present embodiment is not required to include Cu. Therefore, the lower limit value for the Cu content is 0%. However, Cu is an element which is effective in improving strength. Cu improves strength of a steel sheet through solid solution strengthening or precipitation strengthening due to precipitation in ferrite. In order to achieve the effect, Cu of 0.01% or more may be contained.

On the other hand, a phenomenon, in which Cu is liquefied in a grain boundary during hot rolling and embrittles a steel sheet in a case where the Cu content exceeds 1.00%, has been known. In order to avoid this embrittlement, in a case where Cu is contained, it is preferable that Ni is also contained. However, the upper limit value for the addition amount of Cu is 1.00%.

(Nb: 0% to 0.30%)

The steel sheet according to the present embodiment is not required to include Nb. Therefore, the lower limit value for the Nb content is 0%. However, Nb is an element which improves strength of a steel sheet through grain refinement of austenite during a heat treatment process. In order to achieve the effect of grain refinement of austenite, Nb of 0.005% or more may be contained. On the other hand, in a case where the Nb content exceeds 0.30%, alloy carbide containing Nb is excessively precipitated in a grain boundary and a steel sheet is embrittled, so that the upper limit value for the Nb content is set to 0.30%.

(Ti: 0% to 0.30%)

The steel sheet according to the present embodiment is not required to include Ti. Therefore, the lower limit value for the Ti content is 0%. However, Ti is an element which increases the grain boundary area of austenite through grain refinement of austenite during a heat treatment process and promotes ferritic transformation. In order to achieve the effect of grain refinement of austenite, Ti of 0.005% or more may be contained. On the other hand, in a case where the Ti content exceeds 0.30%, carbide containing Ti is excessively precipitated in a grain boundary and a steel sheet is embrittled, so that the upper limit value for the Ti content is set to 0.30%.

(V: 0% to 0.50%)

The steel sheet according to the present embodiment is not required to include V. Therefore, the lower limit value for the V content is 0%. However, V is an element which increases the grain boundary area of austenite through grain refinement of austenite during a heat treatment process and promotes ferritic transformation. In order to achieve the effect of grain refinement of austenite, V of 0.005% or more may be contained. On the other hand, in a case where the V content exceeds 0.50%, carbide containing V is excessively precipitated in a grain boundary and a steel sheet is embrittled, so that the upper limit value for the V content is set to 0.50%.

(B: 0% to 0.0100%)

The steel sheet according to the present embodiment is not required to include B. Therefore, the lower limit value for the B content is 0%. However, B is an element which suppresses ferritic transformation by being segregated in a grain boundary of austenite during a heat treatment process, such that strength of a steel sheet is thereby enhanced. In order to achieve the effect, B of 0.0001% or more may be contained. On the other hand, in a case where the B content exceeds 0.0100%, not only the effect of suppressing ferritic transformation is saturated, but also boride is generated in a grain boundary and a steel sheet is embrittled, so that the upper limit value for the B content is set to 0.0100%.

(Ca: 0% to 0.0400%)
(Mg: 0% to 0.0400%)
(REM: 0% to 0.0400%)

The steel sheet according to the present embodiment is not required to include Ca, Mg, and REM. Therefore, the lower limit values for the Ca content, the Mg content, and the REM content are 0%. However, Ca, Mg, and REM are elements which control the forms of oxide and sulfide and improve hole expansibility. In order to achieve the effect, one or more of selected from the group consisting of Ca of 0.0005% or more, Mg of 0.0005% or more, and REM of 0.0005% or more may be contained. More preferably, each of the Ca content, the Mg content, and the REM content is 0.0010% or more. On the other hand, in a case where each of the Ca content, the Mg content, and the REM content exceeds 0.0400%, coarse oxide is formed, so that hole expansibility of a steel sheet is deteriorated. Therefore, the upper limit value for each of the Ca content, the Mg content, and the REM content is 0.0400%. More preferably, the upper limit value for each of the Ca content, the Mg content, and the REM content is 0.0100%.

"REM" indicates 17 elements in total consisting of Sc, Y, and lanthanoid, and "the amount of REM" indicates the total amount of these 17 elements. REM is often added in a form of a misch metal. There are cases where a lanthanoide-based element is added in addition to La and Ce. In this case as well, the steel sheet according to the present embodiment exhibits the effect described above. In addition, even if metal REM such as metal La and metal Ce is added, the steel sheet according to the present embodiment exhibits the effect described above.

In the chemical composition of the steel sheet according to the present embodiment, the remainder includes iron (Fe) and impurities. Impurities indicate compositions which have been incorporated due to raw materials such as ores or scraps, or various factors in a manufacturing process when a steel is industrially manufactured. Impurities are allowed within a range not adversely affecting the present invention.

The steel sheet according to the present embodiment may be a hot-dip galvanized steel sheet further including a hot-dip galvanized layer in which Fe is less than 7 mass % and the remainder includes Zn, Al, and impurities, and which is formed on a surface of the steel sheet. Alternatively, the steel sheet according to the present embodiment may be a galvannealed steel sheet further including a hot-dip galvanized layer in which Fe is 7 mass % to 15 mass % and the remainder includes Zn, Al, and impurities, and which is formed on a surface of the steel sheet.

Next, examples of a method for manufacturing the steel sheet according to the present embodiment, a hot-dip galvanized steel sheet, and a galvannealed steel sheet will be described.

In the method for manufacturing the steel sheet according to the present embodiment, a cast slab having the same composition as the steel sheet according to the present embodiment is directly subjected to (that is, without being cooled and reheated) hot rolling, or is reheated to 1,100° C. or higher after being temporarily cooled and is subjected to hot rolling. Hot rolling is completed at a temperature range of 850° C. or higher and coiling is performed at a temperature range of 750° C. or lower. Then, pickling is performed, and the cast slab is subjected to cold rolling at a rolling reduction of 30% to 80%. Subsequently, the cast slab is annealed and is cooled.

A cast slab subjected to hot rolling in the method of manufacturing the steel sheet according to the present embodiment is not limited to a particular cast slab as long as the cast slab has the same composition as the steel sheet according to the present embodiment. For example, a cast slab need only be a continuous cast slab, a slab manufactured by using a thin slab caster, or the like.

(Heating Temperature of Cast Slab Before Hot Rolling: 1,100° C. or Higher)

A cast slab is directly subjected to (that is, without being cooled to be lower than 1,100° C.) hot rolling, or is reheated after being temporarily cooled and is subjected to hot rolling. In a case where a cast slab is temporarily cooled and is subsequently reheated, the heating temperature is set to 1,100° C. or higher. There are cases where the steel sheet according to the present embodiment includes a large amount of an alloying element. Since an alloying element is required to be solid-solubilized in a cast slab before hot rolling, the cast slab is required to be heated at a high temperature before hot rolling. In a case where the heating temperature is lower than 1,100° C., coarse alloy carbide remains, and this alloy carbide causes slab cracking. Here, the heating temperature is preferably 1,180° C. or higher and is more preferably 1,200° C. or higher.

(Finishing Temperature of Hot Rolling: 850° C. or Higher)

In consideration of deformation resistance during rolling, it is desirable that hot rolling is completed as the austenite single phase range at a finish rolling temperature of 850° C. or higher. In a case where the finish rolling temperature is 850° C. or lower, not only a load on a rolling stand increases, but also deformation resistance rapidly changes so that it becomes difficult to perform stable rolling in a case where ferritic transformation starts during hot rolling. Generally, in hot rolling, there is a temperature deviation in the width direction. Therefore, in this case, the finish rolling temperature indicates a temperature of the center portion in the width direction.

During hot rolling, rough rolled sheets may be joined to each other and hot rolling may be continuously performed.

(Coiling Temperature: 750° C. or Lower)

The coiling temperature need only be 750° C. or lower, and the lower limit is not particularly limited. However, it is technically difficult to wind a hot rolled steel sheet at room temperature or lower. Therefore, the room temperature becomes a practically lower limit value for the coiling temperature. In a case where the coiling temperature exceeds 750° C., the thickness of oxided scale increases on a surface of a steel sheet after hot rolling, so that it becomes difficult to perform the pickling process thereafter. Therefore, it is preferable that the upper limit for the coiling temperature is set to approximately 750° C. In addition, generally, if the coiling temperature becomes low, the microstructure of a hot rolled steel sheet becomes uniform, and formability of a product after continuous annealing is ameliorated. Therefore, it is desirable that the coiling temperature is a low temperature as much as possible within the allowable range for cold rolling ability. In addition, lowering of the coiling temperature also contributes to amelioration of pickling properties of a steel sheet.

(Pickling)

A coiled hot rolled steel sheet is rewound, is pickled, and is subjected to cold rolling. Oxide on a surface of a hot rolled steel sheet is eliminated through pickling, and chemical convertibility, coating properties, and the like of a cold rolled steel sheet are improved. Pickling may be performed once or may be performed a plurality of times in a divided manner.

(Cumulative Rolling Reduction of Cold Rolling: 30% to 80%)

A pickled hot rolled steel sheet is subjected to cold rolling at the cumulative rolling reduction of 30% to 80%. In a case where the cumulative rolling reduction of cold rolling is less than 30%, it is difficult to maintain a flat shape of a cold rolled steel sheet, so that ductility of a finally obtained steel sheet is degraded. Therefore, the cumulative rolling reduction of cold rolling is set to 30% or more. Preferably, the cumulative rolling reduction of cold rolling is 50% or more. On the other hand, in a case where the cumulative rolling reduction of cold rolling exceeds 80%, a rolling force becomes excessive and it becomes difficult to perform cold rolling, so that it is difficult to perform cold rolling with ordinary manufacturing equipment. However, the cumulative rolling reduction of cold rolling may exceed 80%. Therefore, the cumulative rolling reduction of cold rolling is set to 80% or less. Preferably, the cumulative rolling reduction of cold rolling is 70% or less.

(Annealing)

A steel sheet after cold rolling is annealed. In a case where the annealing temperature (the maximum heating temperature during annealing) is excessively low, granular bainite and martensite having a predetermined area ratio cannot be obtained. The reason is that a sufficient amount of austenite is not generated in a case where the annealing temperature is excessively low. These granular bainite and martensite are structures obtained through phase transformation from austenite when austenite generated during annealing is cooled. Therefore, in a case where the annealing temperature is low and the generated amount of austenite to be transformed into granular bainite and martensite is reduced, the area ratios of granular bainite and martensite become insufficient. In a case where the annealing temperature is excessively low, the area ratio of martensite obtained after annealing becomes insufficient, and the product of the area ratio Vm of martensite at the thickness ¼ portion and the average hardness Hv of martensite at the thickness ¼ portion becomes smaller than 12,000.

On the other hand, in a case where the annealing temperature is excessively high, the amount of ferrite after annealing becomes insufficient, so that not only ductility of a steel sheet is degraded, but also generation of granular bainite is delayed. Therefore, in a case where the annealing temperature is excessively high, sufficient area ratios of ferrite and granular bainite cannot be obtained. This reduction of the area ratio of ferrite due to the high annealing temperature is caused when grain growth of austenite is promoted and thus the area ratio of ferrite generated through cooling thereafter is reduced. Moreover, in a case where the annealing temperature is excessively high, the product of the area ratio Vm of martensite at the thickness ¼ portion and the average hardness Hv of martensite at the thickness ¼ portion exceeds 34,000. The reason is that the average hardness of martensite is degraded but the area ratio of martensite is drastically increased in a case where the annealing temperature is excessively high.

The annealing temperature required to ensure predetermined amounts of ferrite, granular bainite, and martensite and to obtain a steel sheet of which Vm×Hv is controlled within a predetermined range varies depending on the alloy composition of the steel sheet. Particularly, the Mn content, the Cr content, the Mo content, the B content, and the like which are elements improving hardenability are required to be considered when the annealing temperature is set. Moreover, the cooling conditions after annealing are also required to be considered when the annealing temperature is set.

In a steel sheet having a large amount of elements improving hardenability, in a case where the annealing temperature is set to an austenite single phase temperature, ferritic transformation does not occur during cooling after annealing, so that it is difficult to ensure a sufficient ferrite fraction. Therefore, in a steel sheet having a large amount of elements improving hardenability, the two phase range region of austenite and ferrite is often required by relatively lowering the annealing temperature. On the other hand, in a steel sheet having a small amount of these elements improving hardenability, or in a steel sheet having a large addition amount of elements generating ferrite, such as Si or Al, even if annealing is performed at the austenite single phase temperature, ferritic transformation proceeds during cooling after annealing, so that a sufficient ferrite fraction is easily ensured.

In addition, as described below, the cooling conditions after annealing also affect the ferrite fraction. In a case where mild cooling is performed such that the amount of ferrite is increased, even if the annealing temperature is in the austenite single phase range, a predetermined amount of ferrite is easily ensured.

As long as a steel sheet in which predetermined amounts of ferrite, granular bainite, and martensite are ensured and Vm×Hv is controlled within a predetermined range can be obtained, the temperature range of the annealing temperature may be the two phase range of austenite and ferrite or may be the austenite single phase range. According to the knowledge of the inventors, in a case where the amount of elements improving hardenability changes within the range of the chemical composition of the steel sheet according to the present embodiment described above, the annealing temperature satisfying the conditions described above is often within a range of 780° C. to 840° C.

The atmosphere during annealing is not particularly limited. Annealing may be performed at a reduction atmosphere or may be performed at an oxidation-reduction atmosphere.

(Cooling)

A steel sheet after annealing is cooled. In order to cause ferritic transformation within the maximum heating temperature in annealing to a temperature range of 620° C. to 820° C., a steel sheet may be subjected to mild cooling at a cooling rate of 0.5° C./s to 15° C./s. That is, in order to cause austenite obtained through annealing to be transformed and to obtain a predetermined area ratio of ferrite, mild cooling may be performed at a slow cooling rate, such that the ferrite fraction is thereby adjusted. On the other hand, in a case where annealing is performed while the maximum heating temperature is set to a temperature of the two phase range of austenite and ferrite, and a predetermined amount of the area ratio of ferrite is obtained, there is no problem even if mild cooling is not performed. Mild cooling is performed by any desired cooling way such as blowing of a steel sheet. The mild cooling rate is a value obtained by dividing the amount of change in temperature from the start to the end of mild cooling by the time from the start to the end of mild cooling. The mild cooling stop temperature is a steel sheet temperature when mild cooling is stopped.

A steel sheet is cooled from the mild cooling stop temperature or the maximum heating temperature in annealing to a temperature range of 450° C. to 650° C. The area ratio of ferrite may increase due to ferritic transformation during this cooling. However, the cooling rate is adjusted such that the area ratio of ferrite does not exceed a predetermined area ratio. The cooling rate at this time is substantially within a range of 1° C./s to 200° C./s. In a case where the cooling rate is slower than 1° C./s, excessive alloy addition is required to suppress ferritic transformation, the length of cooling equipment in the continuous annealing line is required to be elongated, or the line speed is required to be excessively reduced during sheet threading. Therefore, a substantial lower limit for the cooling rate is 1° C./s. Since it is difficult to realize a cooling rate exceeding 200° C./s due to equipment, a substantial upper limit for the cooling rate is 200° C./s. Cooling is performed by any desired cooling way such as blowing of a steel sheet or pouring cooling water to a steel sheet. The cooling rate is a value obtained by dividing the amount of change in temperature from the start to the end of cooling by the time from the start to the end of cooling. The cooling stop temperature is a steel sheet temperature when cooling is stopped.

(Limitation on Cooling Stop and Decrease in Steel Sheet Temperature)

If the temperature of a steel sheet is within a temperature range of 450° C. to 650° C. through cooling, cooling of the steel sheet is stopped, and the decreasing speed of the steel sheet temperature is limited to a speed slower than 1.0° C./sec for 10 seconds to 600 seconds. Accordingly, granular bainite is generated in the steel sheet. Hereinafter, there are cases where limiting the decreasing speed of the steel sheet temperature to a speed slower than 1.0° C./sec will be referred to as "retention of a steel sheet temperature".

Granular bainite is a structure which is generated when a plurality of grains of bainitic ferrite become one ingot due to recovered dislocation present in an interface thereof. Such recovery of dislocation and generation of bainitic ferrite can be significantly generated within a temperature range of 450° C. to 650° C. In the method of manufacturing the steel sheet according to the present embodiment, a sufficient area ratio of granular bainite can be ensured by limiting the decreasing speed of the steel sheet temperature to a speed slower than 1.0° C./sec for 10 seconds or longer within this temperature range, or isothermally retaining the steel sheet temperature. Preferably, generation of granular bainite proceeds by halting the temperature of a steel sheet within a range of 480° C. to 580° C. for 10 seconds or longer. In addition, in order to prevent pearlitic transformation and precipitation of cementite, it is preferable that the upper limit for the retention time of the steel sheet temperature is set to 600 seconds. That is, a range of 10 seconds to 600 seconds becomes a substantial range of the retention time of the steel sheet temperature.

In a case where a cold rolled steel sheet is manufactured, the area ratio of bainite and martensite can be adjusted by an over-aging zone incidental to continuous annealing equipment. In the method of manufacturing the steel sheet according to the present embodiment, there is no need to limit the heat treatment conditions for the over-aging zone. However, generally, heat treatment in the over-aging zone is performed such that the steel sheet temperature is retained within a temperature range of 200° C. to 350° C. for 30 seconds to shorter than 2,000 seconds. If the retention temperature in this over-aging zone becomes excessively high, there is concern that cementite, pearlite, and the like will be generated, so that strength of a steel sheet is degraded and hole expansibility is deteriorated. Therefore, 350° C. is normally set as the upper limit for the retention temperature in the over-aging zone. If the retention temperature in the over-aging zone is excessively low, there is little difference between this case and a case where cooling is performed without performing over-aging. Therefore, in order to achieve a substantial over-aging effect, it is desirable that the retention temperature in the over-aging zone is set to 200° C. or higher. In addition, similarly, in a case where the retention time is short, there is little difference between this case and a case where cooling is performed without performing over-aging. Therefore, in order to achieve a substantial over-aging effect, it is desirable that the temperature retention time in the over-aging zone is set to 30 seconds or longer. Moreover, in a case where the temperature retention time is longer than necessary, although it depends on the retained temperature, there is concern that cementite, pearlite, and the like will be generated, so that strength of a steel sheet is degraded and hole expansibility is deteriorated. Moreover, in consideration of the line length of a continuous annealing line as well, 2,000 seconds become a substantial upper limit for the temperature retention time.

In a case where a steel sheet is subjected to galvanizing, after the steel sheet temperature is retained, in order to perform hot dip galvanizing, the steel sheet is cooled to a temperature near a range of 450° C. to 480° C., which is a zinc pot temperature. In this cooling, the cooling rate is not particularly limited. However, it is realistic to set the cooling rate within a range of 1° C./seconds to 100° C./seconds. On the other hand, in a case of a steel sheet which is not subjected to galvanizing, the steel sheet may be cooled to room temperature after a predetermined area ratio of granular bainite is ensured within a range of 450° C. to 650° C. In this case as well, the cooling rate is not particularly limited. However, it is realistic to set the cooling rate within a range of 1° C./seconds to 100° C./seconds. Limiting the decreasing speed of the steel sheet temperature to a speed slower than 1.0° C./sec is performed by any desired way of temperature retention, such as leaving a steel sheet without cooling, or mounting a steel sheet in a furnace for isothermal retention. The retention time of the steel sheet temperature indicates the duration of a state where the decreasing speed of the steel sheet temperature is limited to a speed slower than 1.0° C./sec.

(Hot Dip Galvanizing)

In the method of manufacturing the steel sheet according to the present embodiment, a coating process is not essential. However, a steel sheet after cooling may be subjected to hot dip galvanizing, as necessary. In a case where a steel sheet before hot dip galvanizing is cooled to a temperature lower than a hot dip galvanizing bath temperature by 40° C. or more, hot dip galvanizing can be performed after the steel sheet is heated to a range of (the hot dip galvanizing bath temperature-40)° C. to (the hot dip galvanizing bath temperature+50°) C. Even if hot dip galvanizing is performed, the structure of the steel sheet is maintained, and elongation of the steel sheet is sufficiently maintained.

(Alloying Treatment)

As necessary, a steel sheet subjected to hot dip galvanizing may be subjected to alloying treatment within a temperature range of 460° C. to 600° C. In a case where alloying treatment is performed at 460° C. or lower, a plated layer is not sufficiently alloyed. In addition, if alloying treatment is performed at temperature of 600° C. or higher, alloying of a plated layer excessively proceeds, so that corrosion resistance of the plated layer is deteriorated.

(Tempering of Martensite)

As described above, after a steel sheet is subjected to annealing, any desired mild cooling, cooling, limitation on the temperature decreasing speed, any desired galvanizing, and alloying in annealing equipment, the steel sheet is finally cooled to a temperature near the room temperature. Then, martensitic transformation occurs in the steel sheet, and thus it is possible to obtain a steel sheet including martensite having a predetermined area fraction. Here, hole expansibility is further ameliorated by tempering the martensite in any desired manner. The reason is that the hardness difference between the phase of hard martensite and a phase softer than martensite such as ferrite and granular bainite is reduced by tempering martensite. Tempering may be performed after a steel sheet is completely cooled to a temperature near the room temperature. After a steel sheet is cooled to a temperature Ms or lower which is the martensitic transformation start temperature, and an area ratio of martensite to a certain extent is obtained, reheating may be performed before the steel sheet temperature decreases to a temperature neat the room temperature.

Tempering is performed by retaining a steel sheet within a temperature range of 150° C. to 400° C. for 2 seconds or longer. Tempering is an important process for obtaining tempered martensite. In a case where the retention temperature (tempering temperature) is lower than 150° C. or the retention time (tempering time) is shorter than 2 seconds, martensite is not sufficiently tempered, so that tempering becomes meaningless. On the other hand, if the retention temperature exceeds 400° C., the dislocation density in tempered martensite is degraded, so that tensile strength of 980 MPa or higher cannot be obtained. Therefore, tempering is performed within a temperature range of 150° C. to 400° C. for 2 seconds or longer.

For example, electro coating, deposition coating, and the like, and surface treatment such as alloying treatment after the foregoing coating, organic film forming, film lamination, organic salts treatment, inorganic salts treatment, and non-chromium treatment can be applied to an obtained steel sheet. Even if the foregoing surface treatment is performed, uniform deformability and local deformability can be sufficiently maintained.

EXAMPLES

Next, Examples of the present invention will be described. The conditions in Example are examples of conditions employed to check the applicability and the effects of the present invention, and the present invention is not limited to these examples of conditions. The present invention can employ various conditions as long as the object of the present invention can be achieved without departing from the gist of the present invention.

When the annealing conditions described above are suitably combined, it is possible to obtain a steel sheet in which the metallographic structure at the thickness ¼ portion includes, by area ratio, ferrite: 10% or more and less than 50%, granular bainite: 5% or more and less than 50%, martensite: 20% or more and less than 60%, and upper bainite, lower bainite, residual austenite, and pearlite in total: less than 15%; and the product of the area ratio Vm of martensite at the thickness ¼ portion and the average hardness Hv of martensite at the thickness ¼ portion is 12,000 to 34,000.

The inventors have performed an experiment described below. First, slabs having the chemical compositions shown in Table 1 were smelted. Thereafter, the slabs were reheated to 1,220° C. which was an extraction temperature. Finish hot rolling was performed to the thickness of 2.5 mm within the finishing temperature range of 890° C. to 920° C., and hot rolled steel sheets were obtained. These hot rolled steel sheets were coiled within a temperature range of 550° C. to 600° C. and were subjected to air cooling to a temperature near the room temperature. Thereafter, scale on a surface layer of the hot rolled steel sheet was eliminated through pickling. Subsequently, the hot rolled steel sheets were subjected to cold rolling to the thickness of 1.2 mm, and cold rolled steel sheets were obtained. Under the annealing conditions, the mild cooling conditions, the cooling conditions, and the reheating conditions shown in Table 2, these cold rolled steel sheets passed through a continuous annealing line and a continuous hot dip galvanizing line. Skin pass rolling equipment was provided in a final process of each line, and the cold rolled steel sheets were subjected to skin pass at an elongation rate within a range of 0.3% to 0.5%. The shapes were corrected and the yield point (YP) was adjusted. Table 3 shows the results of the analysis of the microstructures and investigation of the mechanical characteristics of the obtained steel sheets.

The remainder of the chemical composition shown in Table 1 is Fe and impurities. In Table 1, the numeric values beyond the regulation range the present invention are underlined. In Table 1, the symbol "-" indicates that the amount of the element corresponding to the symbol is equal to or smaller than the level regarded as impurities in the steel corresponding to the symbol. In Table 2-1, "Mild cooling rate" and "Mild cooling stop temperature" of the sample which was not subjected to mild cooling were marked with "-". In Table 2-1, as the kind of the steel sheet, a symbol "a" was applied to a cold rolled steel sheet. As the kind of the steel sheet, a symbol "b" was applied to a hot-dip galvanized steel sheet. As the kind of the steel sheet, a symbol "c" was applied to a galvannealed steel sheet. In Table 2-2, "Coating bath interstitial sheet temperature" and "Alloying temperature" of the sample which was not subjected to galvanizing and alloying were marked with "-".

The area ratio of ferrite at the thickness ¼ portion was calculated by observing an electron channeling contrast image of a cross section at the thickness ¼ portion obtained by using a scanning electron microscope.

The area ratio Vm of martensite at the thickness ¼ portion was the total value of the area ratios of untempered fresh martensite and tempered martensite. The area ratio of fresh martensite was calculated by observing an image of a cross section at the thickness ¼ portion etched with a Le Pera solution, which was obtained by using a field-emission scanning electron microscopy. The area ratio of tempered martensite was calculated by observing an image of a cross section at the thickness ¼ portion which had corroded due to a nital reagent, using a field-emission scanning electron microscopy.

The area ratio of granular bainite at the thickness ¼ portion was obtained by subtracting the area ratios of upper bainite, lower bainite, tempered martensite, pearlite, and martensite from the area ratio of a region in which the value of grain average misorientation at the thickness ¼ portion became 0.5° or larger. The region in which the value of grain average misorientation became 0.5° or larger was specified by measuring the thickness ¼ portion at intervals of 0.2 μm, and calculating the value of grain average misorientation from the measurement data, using an EBSD device. The area ratios of upper bainite, lower bainite, and pearlite were calculated by observing an image of a cross section at the thickness ¼ portion which had corroded due to a nital reagent, using a field-emission scanning electron microscopy.

The area ratio of the remainder at the thickness ¼ portion was set to the area ratio of a region other than ferrite, granular bainite, and martensite. The area ratio of the remainder at the thickness ¼ portion can be substantially regarded as the total area ratio of upper bainite, lower bainite, residual austenite, and pearlite.

The average hardness of martensite at the thickness ¼ portion (the average hardness of martensite) was obtained by measuring hardness of martensite at the thickness ¼ portion, using a Vickers hardness meter. The hardness was measured such that an indentation made during the measurement of Vickers hardness is included inside one martensite grain. Hardness of 50 martensite grains was measured, and the average value of the hardness of the grains was regarded as the average hardness Hv of martensite at the thickness ¼ portion.

The tensile strength (TS) and the total elongation (El) were measured by collecting test pieces of No. 5 of JIS such that the longitudinal direction of the test pieces formed a right angle to the rolling direction of the steel sheet, and performing a tension test thereto conforming to JIS Z 2242.

The hole expansibility (λ) was evaluated in accordance with the test method for hole widening disclosed in JIS Z 2256 of Japanese Industrial Standard.

TABLE 1

| Steel No. | Chemical composition (mass %) | | | | | | | | | | | | |
|---|---|---|---|---|---|---|---|---|---|---|---|---|---|
| | C | Si | Al | Mn | Cr | P | S | N | O | Mo | Ni | Cu | Nb |
| A | 0.07 | 0.35 | 0.03 | 2.33 | 0.01 | 0.012 | 0.0022 | 0.0033 | 0.0021 | 0.07 | — | — | 0.01 |
| B | 0.08 | 0.25 | 0.22 | 1.88 | 0.22 | 0.009 | 0.0034 | 0.0024 | 0.0019 | 0.01 | — | — | 0.02 |
| C | 0.08 | 1.35 | 0.02 | 2.15 | 0.02 | 0.008 | 0.0067 | 0.0029 | 0.0018 | 0.05 | — | — | 0.02 |
| D | 0.09 | 0.44 | 0.03 | 2.65 | 0.03 | 0.011 | 0.0034 | 0.0028 | 0.0022 | — | — | — | 0.01 |
| E | 0.13 | 1.55 | 0.02 | 1.59 | 0.06 | 0.008 | 0.0025 | 0.0031 | 0.0023 | 0.22 | — | — | 0.04 |
| F | 0.11 | 0.03 | 0.65 | 2.21 | 0.02 | 0.007 | 0.0028 | 0.0022 | 0.0034 | 0.06 | 0.02 | — | 0.02 |
| G | 0.12 | 0.44 | 0.03 | 1.77 | 0.45 | 0.011 | 0.0030 | 0.0029 | 0.0033 | — | 0.01 | 0.03 | 0.01 |
| H | 0.11 | 2.11 | 0.03 | 2.51 | 0.01 | 0.010 | 0.0021 | 0.0031 | 0.0022 | 0.11 | — | — | — |
| I | 0.14 | 0.55 | 0.03 | 1.86 | — | 0.010 | 0.0022 | 0.0030 | 0.0022 | — | 0.66 | — | — |
| J | 0.13 | 0.23 | 0.44 | 2.35 | — | 0.009 | 0.0033 | 0.0035 | 0.0032 | — | — | — | — |
| K | 0.09 | 0.28 | 0.02 | 2.41 | — | 0.008 | 0.0028 | 0.0033 | 0.0021 | — | 0.04 | 0.08 | 0.02 |
| L | <u>0.05</u> | 0.44 | 0.03 | 2.43 | — | 0.011 | 0.0028 | 0.0031 | 0.0022 | 0.06 | — | — | 0.01 |
| M | <u>0.18</u> | 0.35 | 0.11 | 2.21 | 0.03 | 0.009 | 0.0041 | 0.0030 | 0.0025 | 0.11 | — | — | 0.02 |
| N | 0.09 | 0.11 | 0.03 | 2.39 | — | 0.010 | 0.0033 | 0.0029 | 0.0021 | — | — | — | 0.01 |
| O | 0.11 | 1.64 | 1.80 | 2.10 | 0.02 | 0.011 | 0.0043 | 0.0029 | 0.0019 | — | 0.04 | — | 0.02 |
| P | 0.08 | 0.51 | 0.13 | 1.23 | 0.03 | 0.008 | 0.0029 | 0.0026 | 0.0022 | 0.04 | — | — | — |
| Q | 0.12 | 0.92 | 0.14 | 2.88 | 0.88 | 0.009 | 0.0022 | 0.0029 | 0.0031 | — | 0.03 | 0.06 | 0.02 |

| Steel No. | Chemical composition (mass %) | | | | | | | | Remarks |
|---|---|---|---|---|---|---|---|---|---|
| | Ti | V | B | Ca | Mg | REM | Si + Al | Mn + Cr | |
| A | 0.03 | — | 0.0018 | — | — | — | 0.38 | 2.34 | Examples |
| B | 0.03 | — | 0.0015 | — | — | — | 0.47 | 2.10 | |
| C | 0.02 | — | 0.0022 | 0.0021 | — | — | 1.37 | 2.17 | |
| D | 0.03 | — | — | — | — | — | 0.47 | 2.68 | |
| E | 0.03 | — | 0.0025 | — | — | 0.0021 | 1.57 | 1.65 | |
| F | 0.03 | — | — | — | — | — | 0.68 | 2.23 | |
| G | 0.03 | 0.02 | 0.0022 | — | — | — | 0.47 | 2.22 | |

TABLE 1-continued

|   | | | | | | | | | |
|---|---|---|---|---|---|---|---|---|---|
| H | 0.03 | — | 0.0024 | — | 0.0033 | — | 2.14 | 2.52 | |
| I | 0.02 | — | 0.0018 | — | — | — | 0.58 | 1.86 | |
| J | 0.03 | — | — | — | — | — | 0.67 | 2.35 | |
| K | 0.02 | — | 0.0019 | — | — | — | 0.30 | 2.41 | |
| L | 0.02 | — | — | — | — | — | 0.47 | 2.43 | Comparative |
| M | 0.03 | — | 0.0022 | — | 0.0028 | — | 0.46 | 2.24 | Examples |
| N | 0.03 | — | — | — | 0.0022 | — | 0.14 | 2.39 | |
| O | 0.03 | — | 0.0019 | 0.0029 | — | — | 3.44 | 2.12 | |
| P | 0.04 | — | 0.0028 | — | — | 0.0029 | 0.64 | 1.26 | |
| Q | 0.03 | — | — | — | — | — | 1.06 | 3.76 | |

TABLE 2-1

| | | | | Cooling | | | Cooling stop and temperature retention | | Over-aging zone | |
|---|---|---|---|---|---|---|---|---|---|---|
| Steel No. | Serial No. | Kind of steel sheet | Annealing Annealing temperature (° C.) | Mild cooling rate (° C./s) | Mild cooling stop temperature (° C.) | Cooling rate (° C./s) | Cooling stop temperature (° C.) | Temperature retention time (sec) | Over-aging zone temperature (° C.) | Retention time (sec) |
| A | 1 | a | 790 | — | — | 16 | 567 | 13 | 290 | 316 |
| A | 2 | a | 781 | 5 | 695 | 24 | 585 | 11 | 285 | 284 |
| A | 3 | a | 823 | — | — | 13 | 595 | 34 | 265 | 294 |
| A | 4 | a | 749 | 4 | 645 | 18 | 567 | 18 | 266 | 288 |
| A | 5 | a | 795 | — | — | 25 | 430 | 695 | 280 | 244 |
| A | 6 | b | 788 | 4 | 682 | 21 | 592 | 35 | — | — |
| A | 7 | b | 814 | — | — | 54 | 612 | 62 | — | — |
| A | 8 | b | 804 | — | — | 34 | 608 | 36 | — | — |
| A | 9 | b | 839 | 3 | 682 | 24 | 599 | 2 | — | — |
| A | 10 | b | 815 | — | — | 30 | 421 | 8 | — | — |
| A | 11 | c | 814 | — | — | 23 | 595 | 62 | — | — |
| A | 12 | c | 812 | 4 | 675 | 19 | 611 | 46 | — | — |
| A | 13 | c | 849 | — | — | 25 | 504 | 38 | — | — |
| A | 14 | c | 805 | — | — | 22 | 432 | 121 | — | — |
| B | 15 | a | 812 | 3 | 705 | 18 | 501 | 15 | 260 | 211 |
| B | 16 | b | 822 | — | — | 22 | 511 | 311 | — | — |
| B | 17 | c | 795 | 3 | 681 | 19 | 505 | 105 | — | — |
| C | 18 | a | 798 | — | — | 35 | 488 | 16 | 290 | 56 |
| C | 19 | b | 811 | — | — | 21 | 511 | 55 | — | — |
| C | 20 | c | 812 | — | — | 8 | 499 | 35 | — | — |
| D | 21 | c | 799 | — | — | 23 | 554 | 39 | — | — |
| E | 22 | c | 805 | 4 | 699 | 34 | 481 | 38 | — | — |
| F | 23 | c | 785 | — | — | 22 | 513 | 34 | — | — |
| G | 24 | c | 796 | — | — | 19 | 495 | 44 | — | — |
| H | 25 | c | 811 | 5 | 711 | 23 | 511 | 28 | — | — |
| I | 26 | c | 805 | — | — | 7 | 513 | 66 | — | — |
| J | 27 | c | 798 | — | — | 33 | 499 | 58 | — | — |
| K | 28 | c | 785 | — | — | 22 | 505 | 33 | — | — |
| L | 29 | c | 804 | — | — | 18 | 502 | 38 | — | — |
| M | 30 | c | 822 | — | — | 25 | 504 | 38 | — | — |
| N | 31 | c | 811 | — | — | 21 | 512 | 94 | — | — |
| O | 32 | c | 799 | 4 | 699 | 28 | 521 | 66 | — | — |
| P | 33 | c | 785 | — | — | 11 | 495 | 35 | — | — |
| Q | 34 | c | 822 | — | — | 21 | 499 | 27 | — | — |
| A | 35 | c | 812 | — | — | 13 | 715 | 22 | — | — |
| A | 36 | c | 811 | — | — | 22 | 466 | 612 | — | — |

TABLE 2-2

| | Galvanizing | | | | |
|---|---|---|---|---|---|
| Serial No. | Presence or absence of coating | Coating bath interstitial sheet temperature (° C.) | Presence or absence of alloying | Alloying temperature (° C.) | Tempering |
| 1 | Absent | — | Absent | — | Absent |
| 2 | Absent | — | Absent | — | Absent |
| 3 | Absent | — | Absent | — | Absent |
| 4 | Absent | — | Absent | — | Absent |

TABLE 2-2-continued

| | | Galvanizing | | | |
|---|---|---|---|---|---|
| Serial No. | Presence or absence of coating | Coating bath interstitial sheet temperature (° C.) | Presence or absence of alloying | Alloying temperature (° C.) | Tempering |
| 5 | Absent | — | Absent | — | Absent |
| 6 | Present | 465 | Absent | — | Absent |
| 7 | Present | 471 | Absent | — | Absent |
| 8 | Present | 466 | Absent | — | Performed at 363° C. for 15 sec after being cooled to room temperature |
| 9 | Present | 468 | Absent | — | Absent |
| 10 | Present | 455 | Absent | — | Absent |
| 11 | Present | 462 | Present | 563 | Absent |
| 12 | Present | 471 | Present | 543 | While being cooled to room temperature, reheated from 140° C., retained at 350° C. for 5 seconds, and then cooled |
| 13 | Present | 467 | Present | 541 | Absent |
| 14 | Present | 466 | Present | 551 | Absent |
| 15 | Absent | — | Absent | — | Absent |
| 16 | Present | 465 | Absent | — | Performed at 185° C. for 3 hours after being cooled to room temperature |
| 17 | Present | 471 | Present | 544 | Absent |
| 18 | Absent | — | Absent | — | Absent |
| 19 | Present | 466 | Absent | — | Absent |
| 20 | Present | 471 | Present | 561 | While being cooled to room temperature, reheated from 172° C., retained at 380° C. for 5 seconds, and then cooled |
| 21 | Present | 476 | Present | 543 | Absent |
| 22 | Present | 466 | Present | 555 | Absent |
| 23 | Present | 465 | Present | 565 | Absent |
| 24 | Present | 461 | Present | 567 | Absent |
| 25 | Present | 463 | Present | 558 | Absent |
| 26 | Present | 467 | Present | 561 | Absent |
| 27 | Present | 468 | Present | 544 | Absent |
| 28 | Present | 471 | Present | 566 | Absent |
| 29 | Present | 470 | Present | 561 | Absent |
| 30 | Present | 468 | Present | 567 | Absent |
| 31 | Present | 468 | Present | 564 | Absent |
| 32 | Present | 470 | Present | 564 | Absent |
| 33 | Present | 471 | Present | 554 | Absent |
| 34 | Present | 488 | Present | 557 | Absent |
| 35 | Present | 455 | Present | 561 | Absent |
| 36 | Present | 465 | Present | 555 | Absent |

TABLE 3-1

| | Area ratio (%) of metallographic structure at thickness ¼ portion | | | | | |
|---|---|---|---|---|---|---|
| Serial No. | Ferrite | Granular bainite | Martensite | Remainder | Hv | Hv × Vm |
| 1 | 32 | 27 | 35 | 6 | 425 | 14875 |
| 2 | 48 | 7 | 40 | 5 | 415 | 16600 |
| 3 | 18 | 15 | 56 | 11 | 354 | 19824 |
| 4 | _63_ | 6 | 20 | 11 | 410 | _8200_ |
| 5 | 37 | 22 | _17_ | _24_ | 399 | _6783_ |
| 6 | 35 | 25 | 31 | 9 | 455 | 14105 |
| 7 | 28 | 19 | 46 | 7 | 390 | 17940 |
| 8 | 33 | 20 | 34 | 13 | 421 | 14314 |
| 9 | _6_ | _3_ | 82 | 9 | 399 | 32718 |
| 10 | 24 | _3_ | 18 | _55_ | 366 | _6588_ |
| 11 | 28 | 22 | 44 | 6 | 418 | 18392 |
| 12 | 38 | 26 | 28 | 8 | 435 | 12180 |
| 13 | _8_ | 11 | _71_ | 10 | 384 | 27264 |
| 14 | 41 | 7 | _18_ | _34_ | 376 | _6768_ |
| 15 | 24 | 37 | 31 | 8 | 392 | 12152 |
| 16 | 21 | 20 | 55 | 4 | 382 | 21010 |
| 17 | 33 | 28 | 28 | 11 | 464 | 12992 |
| 18 | 28 | 21 | 44 | 7 | 399 | 17556 |
| 19 | 31 | 29 | 31 | 9 | 388 | 12028 |
| 20 | 24 | 31 | 41 | 4 | 376 | 15416 |
| 21 | 21 | 24 | 51 | 4 | 369 | 18819 |
| 22 | 22 | 24 | 43 | 11 | 405 | 17415 |
| 23 | 43 | 18 | 29 | 10 | 433 | 12557 |
| 24 | 38 | 19 | 35 | 8 | 398 | 13930 |
| 25 | 39 | 23 | 31 | 7 | 412 | 12772 |
| 26 | 28 | 32 | 33 | 7 | 377 | 12441 |
| 27 | 35 | 24 | 34 | 7 | 388 | 13192 |
| 28 | 32 | 19 | 41 | 8 | 377 | 15457 |
| 29 | _68_ | 13 | _10_ | 9 | 298 | _2980_ |
| 30 | _8_ | 25 | 58 | 9 | 411 | 23838 |
| 31 | 34 | _3_ | 22 | _41_ | 344 | _7568_ |
| 32 | _54_ | 16 | 21 | 9 | 474 | _9954_ |
| 33 | _68_ | 5 | _3_ | _24_ | 377 | _1131_ |
| 34 | _8_ | 17 | _72_ | 3 | 367 | 26424 |
| 35 | 26 | _2_ | _70_ | 2 | 344 | 24080 |
| 36 | 32 | 34 | _10_ | _24_ | 325 | _3250_ |

TABLE 3-2

| Serial No. | TS (MPa) | El (%) | λ (%) | TS × El (MPa · %) | TS × λ (MPa · %) | Remarks |
|---|---|---|---|---|---|---|
| 1 | 1023 | 15 | 28 | 15345 | 28644 | Example |
| 2 | 1005 | 16 | 21 | 16080 | 21105 | Example |
| 3 | 1033 | 14 | 49 | 14462 | 50617 | Example |
| 4 | 930 | 16 | 42 | 14880 | 39060 | Comparative Example |
| 5 | 911 | 18 | 33 | 16398 | 30063 | Comparative Example |
| 6 | 1021 | 14 | 28 | 14294 | 28588 | Example |
| 7 | 1019 | 12 | 48 | 12228 | 48912 | Example |
| 8 | 998 | 13 | 48 | 12974 | 47904 | Example |
| 9 | 1134 | 8 | 64 | 9072 | 72576 | Comparative Example |
| 10 | 895 | 18 | 32 | 16110 | 28640 | Comparative Example |
| 11 | 1033 | 15 | 34 | 15495 | 35122 | Example |
| 12 | 996 | 13 | 49 | 12948 | 48804 | Example |
| 13 | 1071 | 8 | 45 | 8568 | 48195 | Comparative Example |
| 14 | 877 | 19 | 32 | 16663 | 28064 | Comparative Example |
| 15 | 991 | 14 | 36 | 13874 | 35676 | Example |
| 16 | 1001 | 13 | 48 | 13013 | 48048 | Example |
| 17 | 992 | 16 | 26 | 15872 | 25792 | Example |
| 18 | 1055 | 18 | 22 | 18990 | 23210 | Example |
| 19 | 1011 | 15 | 38 | 15165 | 38418 | Example |
| 20 | 1022 | 14 | 46 | 14308 | 47012 | Example |
| 21 | 1046 | 13 | 39 | 13598 | 40794 | Example |
| 22 | 1021 | 13 | 38 | 13273 | 38798 | Example |
| 23 | 1013 | 17 | 29 | 17221 | 29377 | Example |
| 24 | 998 | 16 | 31 | 15968 | 30938 | Example |
| 25 | 1011 | 19 | 24 | 19209 | 24264 | Example |
| 26 | 998 | 17 | 28 | 16966 | 27944 | Example |
| 27 | 989 | 13 | 38 | 12857 | 37582 | Example |
| 28 | 1001 | 14 | 36 | 14014 | 36036 | Example |
| 29 | 768 | 19 | 38 | 14592 | 29184 | Comparative Example |
| 30 | 1238 | 11 | 15 | 13618 | 18570 | Comparative Example |
| 31 | 905 | 16 | 34 | 14480 | 30770 | Comparative Example |
| 32 | 922 | 18 | 10 | 16596 | 9220 | Comparative Example |
| 33 | 911 | 24 | 21 | 21864 | 19131 | Comparative Example |
| 34 | 1021 | 8 | 34 | 8168 | 34714 | Comparative Example |
| 35 | 1113 | 7 | 40 | 7791 | 44520 | Comparative Example |
| 36 | 911 | 15 | 32 | 13665 | 29152 | Comparative Example |

In Examples 1 to 3, 6 to 8, 11, 12, and 15 to 28 of which the chemical composition was within the range of the present invention and of which the manufacturing method was appropriate, the metallographic structure and tensile strength were controlled within the range of the present invention, and total elongation and hole expansibility were excellent.

In the comparative example 4 in which the annealing temperature was excessively low, the area ratio of ferrite became excessive, the product of the area ratio Vm of martensite at the thickness ¼ portion and the average hardness Hv of martensite (Hv×Vm) became insufficient, and tensile strength was insufficient. As a reason thereof, it is assumed that ferrite generated during annealing remained due to the excessively low annealing temperature.

In the comparative example 5 in which the cooling stop temperature was excessively low and the temperature retention time was excessively long, the area ratio of the remainder became excessive, the area ratio of martensite became insufficient, Hv×Vm became insufficient, and tensile strength was insufficient. As a reason thereof, it is assumed that cooling stop and temperature retention were performed within the temperature range in which bainitic transformation was most likely to proceed, so that the amount of bainite became excessive.

In the comparative example 9 in which the temperature retention time was excessively short, the area ratios of ferrite and granular bainite became insufficient, the area ratio of martensite became excessive. Accordingly, TS×El was insufficient compared to the steels of the invention. As a reason thereof, it is assumed that compared to the steels of the invention which can originally achieve favorable mechanical characteristics by having predetermined area ratios of ferrite and martensite, the comparative example 9 exhibited a microstructure substantially constituted of martensite, so that ductility was significantly insufficient.

In the comparative example 10 in which the cooling stop temperature was excessively low and the temperature retention time was excessively short, the area ratio of the remainder became excessive, the area ratios of granular bainite and martensite became insufficient, Hv×Vm became insufficient, and tensile strength was insufficient. As a reason thereof, it is assumed that if the cooling stop temperature was excessively low, bainitic transformation proceeded rapidly, so that the area ratio of bainite which was the residual structure in the comparative example 10 was drastically increased, and tensile strength was reduced.

In the comparative example 13 in which the annealing temperature was excessively high, the area ratio of ferrite became insufficient, and the area ratio of martensite became excessive. Accordingly, TS×El was insufficient. As a reason thereof, it is assumed that, ferritic transformation had not proceeded during cooling after annealing due to the excessively high annealing temperature.

In the comparative example 14 in which the cooling stop temperature was excessively low, the area ratio of the remainder became excessive, the area ratio of martensite became insufficient, Hv×Vm became insufficient, and tensile strength was insufficient. As a reason thereof, it is assumed that cooling stop and temperature retention were performed within the temperature range in which bainitic transformation was most likely to proceed, so that the amount of bainite became excessive.

In the comparative example 29 in which the amount of C that is an element required to ensure the area ratio of martensite was insufficient, the area ratio of martensite became insufficient, the area ratio of ferrite became excessive, Hv×Vm became insufficient, and tensile strength was insufficient.

In the comparative example 30 in which the C content became excessive, the area ratio of ferrite became insufficient. Accordingly, TS×λ was insufficient. As a reason thereof, it is assumed that an excessive amount of C hindered generation of ferrite.

In the comparative example 31 in which the total of the Si content and the Al content that are elements essential for obtaining granular bainite was insufficient, the area ratio of granular bainite was insufficient. The reason is that although it is important to suppress precipitation of cementite by Si and Al in order to generate granular bainite, the Si content and the Al content became insufficient and cementite was precipitated in the comparative example 31. Therefore, in the comparative example 31, the area fraction of bainite which was the residual structure was increased, and the area ratio of martensite was degraded, so that Hv×Vm became insufficient, and tensile strength was insufficient.

In the comparative example 32 in which the total of the Si content and the Al content that are elements generating ferrite became excessive, the area ratio of ferrite became excessive, Hv×Vm became insufficient, and tensile strength and TS×λ were insufficient.

In the comparative example 33 in which the total of the Mn content and the Cr content that are elements suppressing ferritic transformation was insufficient, the area ratio of martensite became insufficient, the area ratios of ferrite and the remainder became excessive, Hv×Vm became insufficient, and tensile strength was insufficient.

In the comparative example 34 in which the total of the Mn content and the Cr content became excessive, ferritic transformation was excessively suppressed, so that the area ratio of ferrite became insufficient, and the area ratio of martensite became excessive. Accordingly, TS×E1 was insufficient.

In the comparative example 35 in which the cooling stop temperature was high, temperature retention was not performed at 650° C. or lower which was the temperature range for generating granular bainite, so that most part of the microstructure became martensite. Therefore, in the comparative example 35, tensile strength was drastically increased, and a soft phase such as ferrite or granular bainite for ductility was insufficient, so that TS×E1 was insufficient.

In the comparative example 36 in which the temperature retention time after the stop of cooling was long, bainite and pearlite were excessively generated due to the temperature retention performed for a long time, and the area ratio of martensite was insufficient, so that TS was insufficient.

The invention claimed is:

1. A steel sheet comprising, as a chemical composition, by unit mass %,
   C: 0.06% to 0.15%,
   P: 0.040% or less,
   S: 0.0100% or less,
   N: 0.0100% or less,
   O: 0.0060% or less,
   Si and Al in total: 0.20% to 2.50%,
   Mn and Cr in total: 1.50% to 3.00%,
   Mo: 0% to 1.00%,
   Ni: 0% to 1.00%,
   Cu: 0% to 1.00%,
   Nb: 0% to 0.30%,
   Ti: 0% to 0.30%,
   V: 0% to 0.50%,
   B: 0% to 0.0100%,
   Ca: 0% to 0.0400%,
   Mg: 0% to 0.0400%,
   REM: 0% to 0.0400%, and
   a remainder including Fe and impurities,
   wherein a metallographic structure at a thickness ¼ portion includes, by unit area %,
   ferrite: 10% or more and less than 50%,
   granular bainite: 5% or more and less than 50%, and
   martensite: 20% or more and less than 60%,
   in the metallographic structure at the thickness ¼ portion, a total of upper bainite, lower bainite, residual austenite, and pearlite is 0% or more and less than 15% by unit area %,
   at the thickness ¼ portion, a product of an area ratio Vm of the martensite and an average hardness Hv of the martensite is 12,000 to 34,000, and
   a tensile strength is 980 MPa or higher,
   wherein the thickness ¼ portion is a portion of the steel sheet between a plane at a depth of ⅛ in a sheet thickness t from a first rolled surface and a plane at a depth of ⅜ in the sheet thickness t from the first rolled surface, wherein the sheet thickness t is a distance between first and second rolled surfaces of the steel sheet, and
   wherein the area ratio is the area ratio in the metallographic structure at the thickness ¼ portion of the steel sheet, the unit of Vm is area %, and the unit of the average hardness Hv is Vickers hardness.

2. The steel sheet according to claim 1, comprising, as the chemical composition of the steel sheet, by unit mass %, one or more of
   Mo: 0.01% to 1.00%,
   Ni: 0.05% to 1.00%, and
   Cu: 0.05% to 1.00%.

3. The steel sheet according to claim 1, comprising, as the chemical composition of the steel sheet, by unit mass %, one or more of
   Nb: 0.005% to 0.30%,
   Ti: 0.005% to 0.30%, and
   V: 0.005% to 0.50%.

4. The steel sheet according to claim 1, comprising, as the chemical composition of the steel sheet, by unit mass %,
   B: 0.0001% to 0.01%.

5. The steel sheet according to claim 1, comprising, as the chemical composition of the steel sheet, by unit mass %, one or more of
   Ca: 0.0005% to 0.04%,
   Mg: 0.0005% to 0.04%, and
   REM: 0.0005% to 0.04%.

6. The steel sheet according to claim 1,
   wherein a hot-dip galvanized layer is provided on a surface of the steel sheet.

7. The steel sheet according to claim 1,
   wherein a galvannealed layer is provided on a surface of the steel sheet.

* * * * *